(12) United States Patent
Drury

(10) Patent No.: US 8,277,275 B2
(45) Date of Patent: Oct. 2, 2012

(54) GAME CALL APPARATUS

(75) Inventor: Mark A. Drury, St. Peters, MO (US)

(73) Assignee: Flambeau, Inc., Baraboo, WI (US)

( * ) Notice: Subject to any disclaimer, the term of this patent is extended or adjusted under 35 U.S.C. 154(b) by 0 days.

(21) Appl. No.: 12/686,718

(22) Filed: Jan. 13, 2010

(65) Prior Publication Data
US 2010/0112893 A1 May 6, 2010
US 2010/0233933 A2 Sep. 16, 2010

Related U.S. Application Data

(63) Continuation of application No. 11/586,832, filed on Oct. 26, 2006, now Pat. No. 7,658,660.

(51) Int. Cl.
*A63H 5/00* (2006.01)
*G10B 3/00* (2006.01)

(52) U.S. Cl. ............... 446/207; 446/208; 84/363

(58) Field of Classification Search ............ 446/202, 446/205–209; 84/363, 364, 383 A, 383 R
See application file for complete search history.

(56) References Cited

U.S. PATENT DOCUMENTS

| | | | |
|---|---|---|---|
| 2,396,359 A | 3/1946 | Yager | |
| 2,544,370 A | 3/1951 | Walther | |
| 2,556,388 A | 6/1951 | Bicocchi | |
| 3,066,444 A | 12/1962 | Dieckmann | |
| 3,656,258 A | 4/1972 | Thomas | |
| 3,772,823 A | 11/1973 | Herter | |
| 4,138,800 A | 2/1979 | Lege | |
| 4,143,485 A | 3/1979 | Stewart | |
| 4,737,130 A | 4/1988 | Mann | |
| 4,888,903 A * | 12/1989 | Knight et al. | 43/1 |
| 4,915,660 A | 4/1990 | Overholt, Sr. | |
| 6,120,341 A | 9/2000 | Hafford | |
| 6,231,417 B1 | 5/2001 | Palmer | |
| 6,234,859 B1 | 5/2001 | Primos et al. | |
| 6,234,860 B1 | 5/2001 | Cook | |
| 6,413,140 B1 | 7/2002 | Primos | |
| 6,435,933 B1 | 8/2002 | Browne | |
| 6,527,614 B1 | 3/2003 | Primos | |
| 6,572,430 B1 * | 6/2003 | Primos | 446/207 |
| 6,575,804 B1 | 6/2003 | Primos | |
| 6,926,578 B1 | 8/2005 | Casias et al. | |
| 7,637,795 B1 * | 12/2009 | Dukart | 446/208 |

OTHER PUBLICATIONS

Photographs of Haydel's Game Calls, Inc. CW-03 Compensator Wood Duck call, first sold in 2003.

* cited by examiner

*Primary Examiner* — Kien Nguyen
(74) *Attorney, Agent, or Firm* — Quarles & Brady LLP

(57) ABSTRACT

A game call apparatus comprises a mouthpiece including an air inlet opening, an air outlet opening, and a mouthpiece air passageway connecting the air inlet opening and the air outlet opening. The game call apparatus further comprises an outer sound chamber including an air inlet opening, an air exit opening, and an internal surface connecting the air inlet opening of the outer sound chamber and the air exit opening. The game call further comprises an inner sound chamber including an air inlet opening and an air outlet opening disposed within the outer sound chamber. The inner sound chamber air passageway connects the air inlet opening of the inner sound chamber and the air outlet opening of the inner sound chamber, and the inner sound chamber air passageway is in communication with the mouthpiece air passageway to permit air passage between the air inlet opening of the mouthpiece and the air exit opening of the outer sound chamber.

1 Claim, 6 Drawing Sheets

GAME CALL APPARATUS

CROSS-REFERENCE TO RELATED APPLICATION

This application is a continuation of application Ser. No. 11/586,832 filed on Oct. 26, 2006, the disclosure of which is hereby incorporated by reference.

STATEMENT OF FEDERALLY SPONSORED RESEARCH OR DEVELOPMENT

Not applicable.

BACKGROUND OF THE INVENTION

This invention relates to game calls for hunting and more particularly to a deer call which will produce the natural sounds of a rutted male deer.

Numerous devices have been developed over the years to imitate the sounds of wild animals, particularly game animals. Many efforts have been attempted to simplify and improve the quality of the sounds produced by game calls. Many game calls require extensive practice before they are mastered. Some users simply cannot master the calls even after hours of practice.

In addition to the problem of the difficulty in using a game call, there are several problems that exist with respect to the effectiveness of traditional game calls. Due to the increased popularity of hunting and the perceived effectiveness of using game calls, more hunters are taking the field each year using a variety of different types of game calls. Accordingly, game animals are becoming increasingly discriminating and wary of many traditional calls. Unless the call is capable of imitating with a high degree of precision actual sounds of the game animal, it will likely be ineffective. Many calls on the market today fail to replicate with enough precision the actual sounds made by the game animal and thus serve primarily to frustrate the hunter. These game calls serve more to alert the animals of a potentially dangerous situation than to call game into close range.

Broadly speaking, there are at least three primary categories of game calls that have existed over the years: diaphragm calls, whistle type calls, and reed calls. Diaphragm calls typically utilize a latex membrane stretched across an air passage opening such that the diaphragm vibrates as air passes through the passage. Whistle type calls are primarily used to simulate whistling sounds made by waterfowl. Whistle calls commonly use one or more balls disposed within a resonant chamber to provide a vibrato effect.

Reed-type game calls are probably the most common type of game call. Reed-type game calls typically include a reed disposed adjacent an air passage. Air is forced through the air passage by an operator through a mouthpiece, which causes the reed to vibrate at a certain tone or pitch, creating a sound that is emitted from an outlet of the call. For all reed-type calls, however, whether used for waterfowl, other species of birds, or game such as deer or elk, there is the problem of the ability or the skill level of the user in producing realistic sounds with the call which will attract the desired game animal. Thus, there is a need to produce a game call which will produce realistic sounds with minimum practice and a minimum skill level of the user.

BRIEF SUMMARY OF THE INVENTION

In one aspect, the invention provides a game call apparatus comprising a mouthpiece including an air inlet opening, an air outlet opening, and a mouthpiece air passageway connecting the air inlet opening and the air outlet opening. The game call apparatus further comprises an outer sound chamber including an air inlet opening, an air exit opening, and an internal surface connecting the air inlet opening of the outer sound chamber and the air exit opening. The game call further comprises an inner sound chamber including an air inlet opening and an air outlet opening disposed within the outer sound chamber. The inner sound chamber air passageway connects the air inlet opening of the inner sound chamber and the air outlet opening of the inner sound chamber, and the inner sound chamber air passageway is in communication with the mouthpiece air passageway to permit air passage between the air inlet opening of the mouthpiece and the air exit opening of the outer sound chamber.

In another aspect, the invention provides a game call apparatus comprising a mouthpiece having an air inlet opening, an air outlet opening, and a mouthpiece air passageway through which air passes from the air inlet opening to the air outlet opening. The game call apparatus further comprises a reed assembly disposed within the mouthpiece air passageway and including a sounding board defining a trough through which air passes within the game call apparatus. The game call apparatus further comprises an inner sound chamber having an air inlet opening, an air outlet opening, and an inner sound chamber air passageway through which air passes from the air inlet opening of the inner sound chamber to the air outlet opening of the inner sound chamber. The inner sound chamber air passageway is in communication with the trough and the mouthpiece air passageway. The game call apparatus further comprises an outer sound chamber in communication with the air outlet opening of the inner sound chamber. The outer sound chamber has an air exit opening through which air from the inner sound chamber air passageway escapes from the game call apparatus.

In yet another aspect, the invention provides a game call apparatus comprising a mouthpiece including an air inlet end and an air outlet end having an axially extending portion defining an air outlet opening. The game call apparatus further comprises an outer sound chamber including a first end removably engaging the mouthpiece and a second end extending away from the mouthpiece. The second end has an air exit opening through which air escapes from the game call apparatus. The game call apparatus further comprises an inner sound chamber extending away from the mouthpiece. The inner sound chamber includes an air inlet end removably engaging the mouthpiece and an air outlet end defining an air outlet opening in communication with the outer sound chamber.

BRIEF DESCRIPTION OF THE DRAWINGS

Further objects and advantages of the invention will appear when taken in conjunction with the accompanying drawings in which.

DETAILED DESCRIPTION OF THE INVENTION

Figure 1:
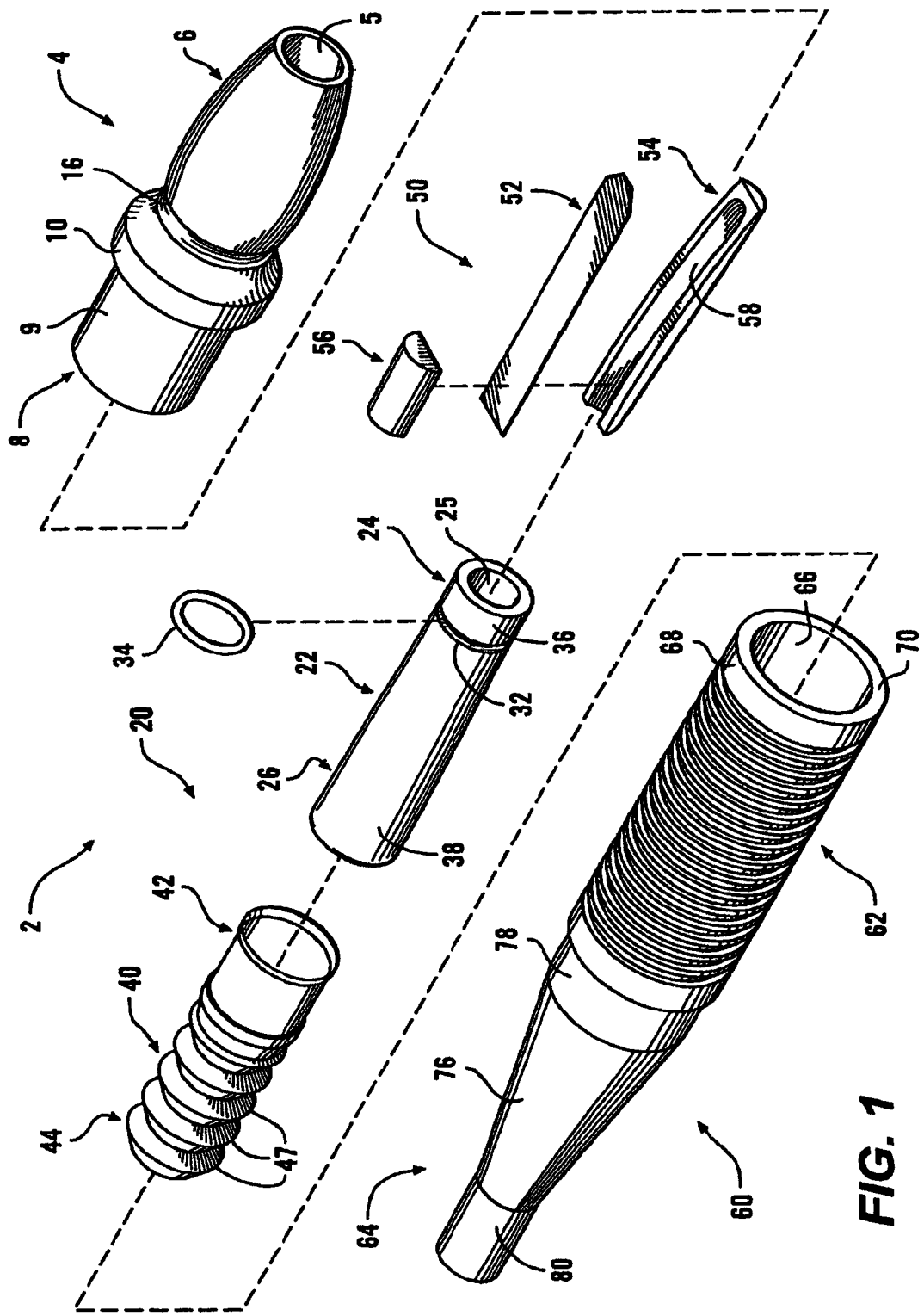
FIG. 1 is an exploded perspective view of a game call apparatus according to the present invention.

Referring generally to the drawings, a game call apparatus 2 according to the present invention is illustrated. The game call apparatus 2 includes a barrel member or mouthpiece 4, an inner tubular sound chamber 20, an outer tubular sound chamber 60, and a reed assembly 50. The mouthpiece 4 has an air passage 18 including an internal cylindrical surface 13 formed by the air inlet end 6 and the air outlet end 8 through which air will pass when the air opening 5 of the mouthpiece 4 is placed in a user's mouth and air is blown into the mouthpiece. A lanyard groove 16 is formed in the mouthpiece approximately midway between the air inlet end 6 and the air outlet end 8 to provide a location for attachment of a lanyard for conveniently carrying the game call apparatus 2. Adjacent the air outlet end 8 of the mouthpiece, an external radially extending annular flange 10 having a flat face 12 is provided for receiving a complimentary flat end face 70 of the outer tubular sound chamber 60 which will be discussed hereinbelow. Also, for snugly receiving the outer tubular sound chamber 60, the air outlet end 8 of the mouthpiece has an external cylindrical surface 9 over which the outer tubular sound chamber 60 can be tightly fitted. The internal cylindrical surface 13 of the air passage 18 adjacent the air outlet end 8 also includes an annular shoulder 14 against which the air inlet end 24 of the inner tubular sound chamber 20 abuts to provide a snug fit of the member 20, as will be discussed further hereinafter. Also, the air passage 18 includes an internal cylindrical surface 15 from which the shoulder 14 extends radially inward and which has a diameter such that the air inlet end 24 of the inner tubular sound chamber 20 is received with a very small clearance.

Figure 3:
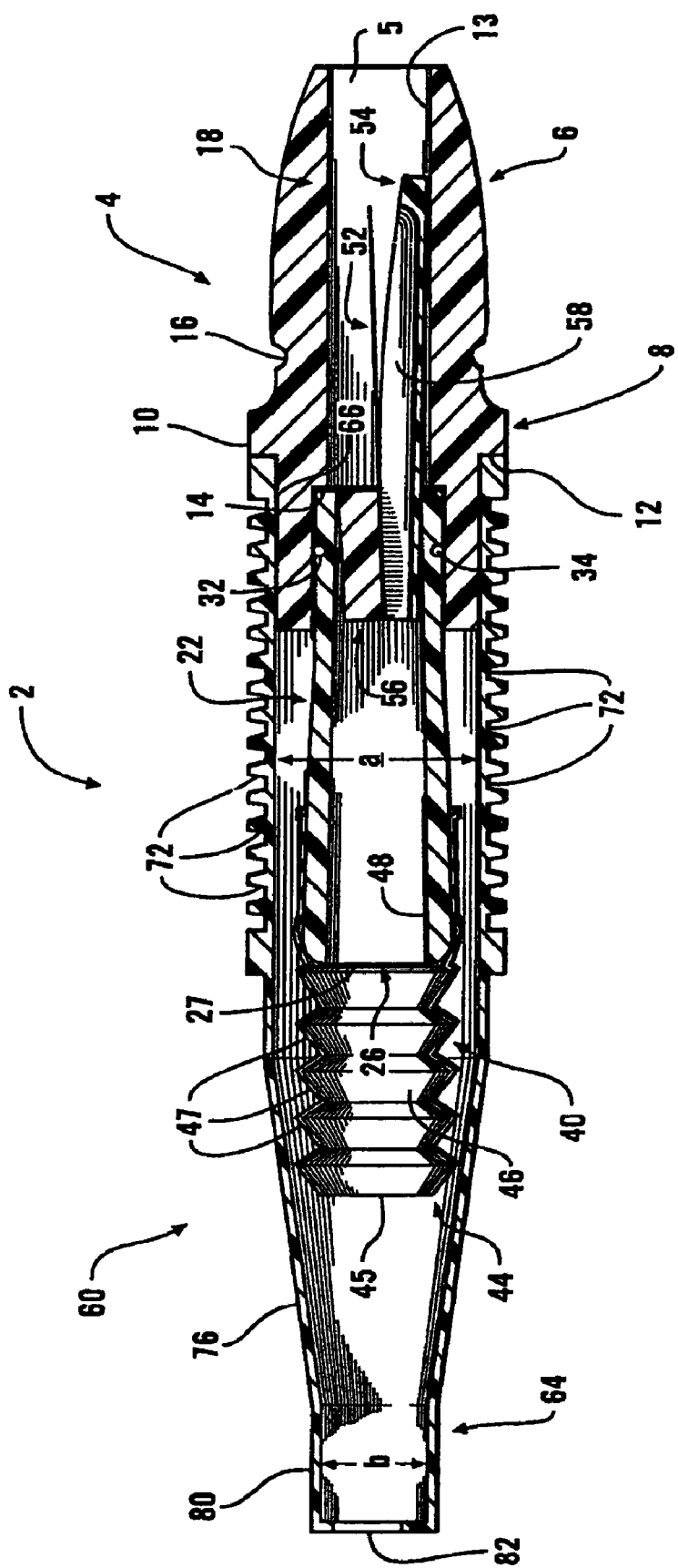
FIG. 3 is a cross-section along the lengthwise axis of the invention.

With reference particularly to FIGS. 1, 3, 5 and 6, the inner tubular sound chamber 20 of the game call apparatus 2 is shown as having a small barrel or first cylindrical extension 22 and a second cylindrical extension 40, both of which may be of a plastic material. The first cylindrical extension 22 includes the air inlet end 24, an air outlet end 26, air inlet 25 and outlet 27 openings respectively in the inlet and outlet ends 24 and 26, and an internal air passageway 28 connecting the air inlet and outlet ends. The air outlet end 26 includes an outer cylindrical surface 38 and an air inlet end 24 having an outer cylindrical surface 36 including a groove 32 in which an o-ring 34 is retained. As can be seen in FIG. 3, when the game call apparatus 2 is assembled, the outer cylindrical surface 36 at the inlet end 24 of the first cylindrical extension 22 fits into the internal cylindrical surface 13 of the mouthpiece 4 and abuts the internal shoulder 14. The combination of the close fit between cylindrical surfaces 13 and 36, the abutment of the end 24 against the internal shoulder 14 and the sealing effect of the o-ring 34 between the cylindrical surfaces 13 and 36 provide a very snug fit between the air passage 18 of the mouthpiece 4 and the inner tubular member 20.

Figure 6:
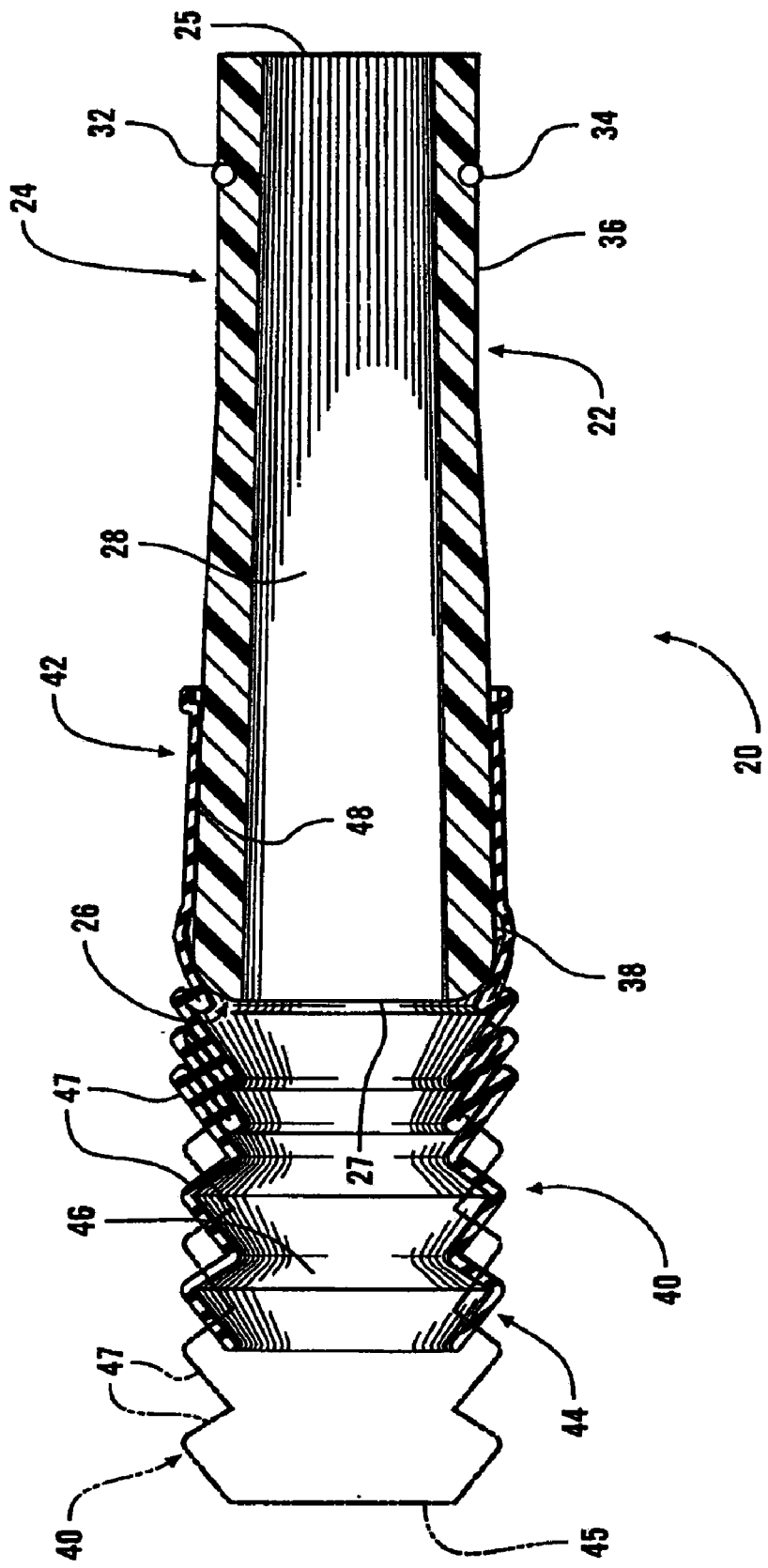
FIG. 6 is a side view of the inner tubular sound chamber of the invention illustrating a corrugated extension section with the corrugations shown fully extended in phantom lines and partially collapsed in full lines.
Figure 7:
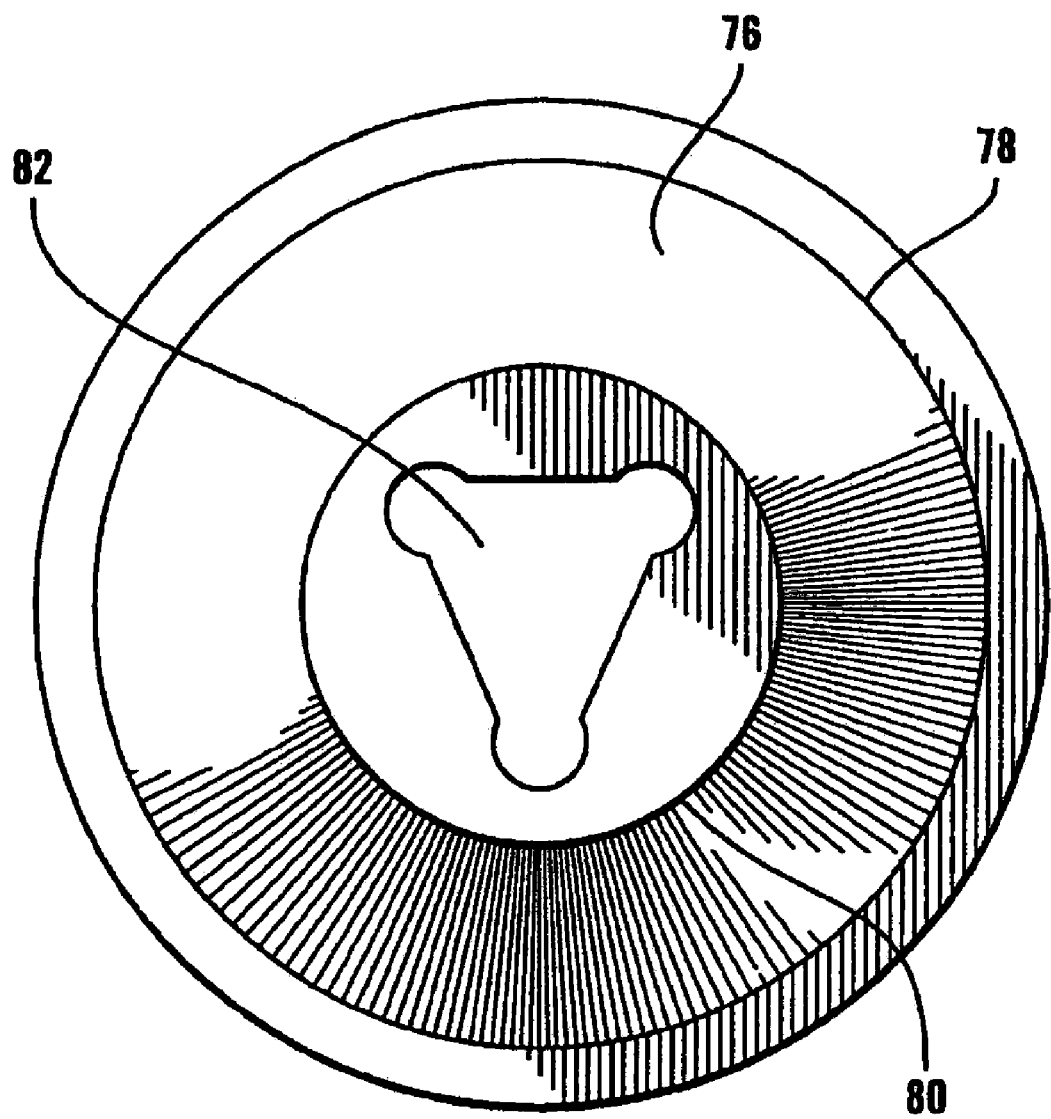
FIG. 7 is an end view showing the air exit opening of the outer tubular sound chamber.

The second cylindrical extension 40, as shown in FIGS. 1, 3 and 6, includes an air inlet end 42, an air outlet end 44 and an air passageway 46 connecting the ends 42 and 44. The air inlet end 42 has an internal cylindrical section 48 having a diameter such that it fits snugly over the cylindrical surface 38 of the air outlet end 26 of the first cylindrical extension 22. Between the cylindrical section 48 and the air outlet end 44 of the second cylindrical extension 40, a plurality of corrugations 47 are formed in the second cylindrical extension 40. As shown in FIG. 6, the corrugations 47 can be fully extended as illustrated in phantom lines or partially collapsed as shown in full lines to thereby adjust the position of the air exit opening 45.

Figure 5:
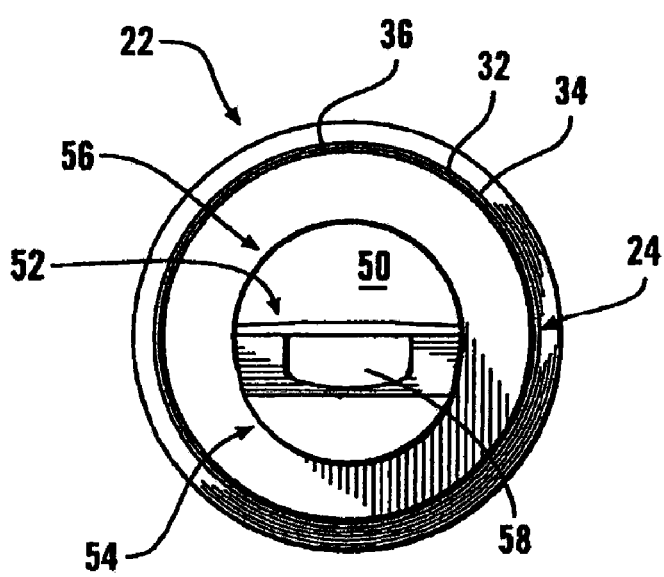
FIG. 5 is an end view of the inlet end of an inner tubular sound chamber with a reed assembly mounted in the chamber.

With reference to FIGS. 1, 3 and 5, a reed assembly 50 is shown mounted in the air inlet opening 25 of the first cylindrical extension 22. The reed assembly includes a vibrating reed 52, a sounding board 54, and a wedge 56 and a wedge end 58 at the end at which the wedge is located. At the wedge end 58 of the assembly 50, the assembly has an essentially cylindrical shape having a slightly larger diameter than the air inlet opening 25 of the first cylindrical extension 22 such that insertion of the reed assembly 50 at the wedge end 58 results in a tight fit of the reed assembly 50 in the first cylindrical extension 22 holding the reed assembly 50 affixed to the extension 22. The sounding board 54 includes a trough 58 along its length which can be seen in FIGS. 1 and 5, and which provides an air passage between the air passage 18 of the mouthpiece 4 and the air passageway 28 of the first cylindrical extension 22. When a user blows into the air opening 5 of the mouthpiece 4, the air passing through the trough 58 of the reed assembly and into the inner tubular sound chamber 20 at a predetermined velocity causes the reed to vibrate against the sounding board 54 to produce sound.

Figure 2:
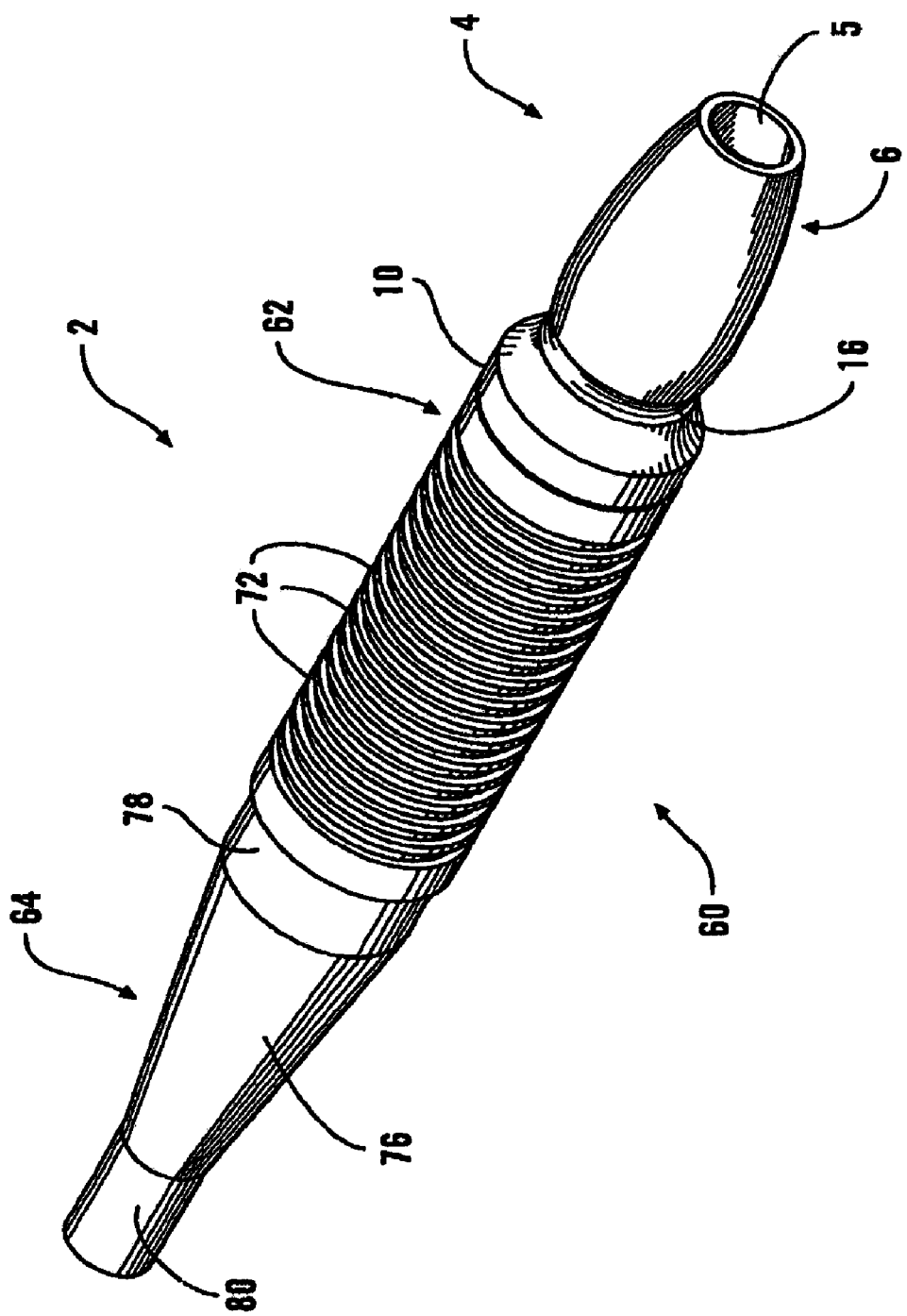
FIG. 2 is a perspective view of the assembled game call apparatus of the invention.
Figure 4:
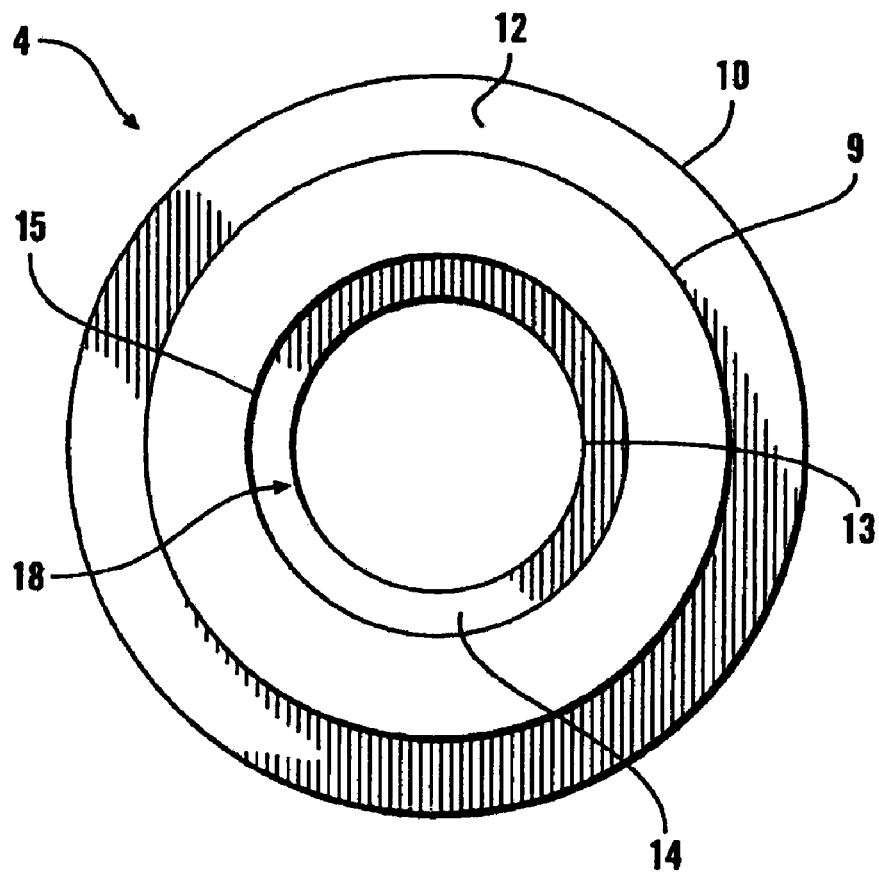
FIG. 4 is an end view of the outlet end of the mouthpiece of the game call apparatus of the invention.

The game call apparatus 2 further includes an outer tubular sound chamber 60 having a cylindrical attachment end 62, an air exit end 64 and an internal cylindrical surface 66 connecting the attachment and air exit ends, as illustrated in FIGS. 1-3. An attachment area 68 having a flat radially extending face 70 is provided at the cylindrical attachment end 62 for snugly fitting the cylindrical attachment end 62 over the outer cylindrical surface 9 and against the flat face 12 of the flange 10 adjacent the air outlet end 8 of the mouthpiece 4. A plurality of circumferential grooves and ridges 72 are provided in the cylindrical surface of the outer tubular member 60 to assist a user in firmly gripping the apparatus. Adjacent the air exit end 64 of the outer tubular member 60, a tapered section 76 is provided which decreases the large internal diameter section 78 from a diameter a to a small internal diameter b at the small diameter section 80. An air exit opening 82 is provided in the small diameter section 80, as shown in FIG. 4, which has a smaller cross-section area than that of the air exit 45 of the second cylindrical extension 40. The material of the tubular sound chamber 60 is a rubber compound having a Shore A hardness of not greater than 90 as measured with a durometer.

With respect to the operation of the game call apparatus, a significantly improved deer call is provided by the tapered constriction of the outer tubular member 60 which causes an air back pressure resulting in a more mellow, deep tonal quality in the growling sound of a rutted buck. The back pressure also assists with improved control of the call so that highly realistic growling, grunting and popping sounds can be produced. The constriction caused by the smaller exit opening 82 in the outer sound chamber also assists with providing the realistic sound.

Another benefit of the game call of the invention relates to the problem that air blown by users through the reed assembly of game calls is often at too high of a velocity. This causes the reed to seize and not vibrate as desired. In the game call disclosed herein the tapered outer tubular sound chamber and the smaller air exit opening from the apparatus decreases the air velocity through the reed assembly so that it is less prone to seizing. This permits air blowing into the mouthpiece that may otherwise be too hard to nevertheless produce a desirable tone quality at the reed.

It will be understood that the forgoing description of the present invention is for purposes of illustration only and that the invention is susceptible to a number of modifications or changes, none of which entail any departure from the spirit and scope of the present invention as defined in the hereto appended claims.

I claim:

1. A game call apparatus comprising:
a mouthpiece having an air inlet opening, an air outlet opening, and a mouthpiece air passageway through which air passes from the air inlet opening to the air outlet opening;
a reed assembly disposed within the mouthpiece air passageway and including a sounding board defining a trough through which air passes within the game call apparatus;
an inner sound chamber having an air inlet opening, an air outlet opening, and an inner sound chamber air passageway through which air passes from the air inlet opening of the inner sound chamber to the air outlet opening of the inner sound chamber, the inner sound chamber air passageway being in communication with the trough and the mouthpiece air passageway, and the inner sound chamber detachably supporting the sounding board; and
an outer sound chamber having an air inlet opening in communication with the air outlet opening of the inner sound chamber, the outer sound chamber further including an air exit opening through which air from the inner sound chamber air passageway escapes from the game call apparatus, and the outer sound chamber tapering inwardly from the air inlet opening of the outer sound chamber to the air exit opening;
wherein the sounding board extends into the inner sound chamber air passageway by less than 50 percent of an axial length of the inner sound chamber air passageway.

* * * * *